United States Patent [19]
Wilson et al.

[11] Patent Number: 5,963,938
[45] Date of Patent: Oct. 5, 1999

[54] AUTOMATIC, CONTEXT-ORGANIZING, QUERY INTERFACE

[75] Inventors: Robert D. Wilson, Pleasant Grove; David S. Nay, Provo, both of Utah

[73] Assignee: Novell Inc., Provo, Utah

[21] Appl. No.: 08/650,146

[22] Filed: May 17, 1996

[51] Int. Cl.[6] .................................................. G06F 17/00
[52] U.S. Cl. .............................................................. 707/4
[58] Field of Search ..................................... 395/140, 133, 395/135, 141, 326, 601–606; 707/4; 345/440, 433, 435, 441, 326

[56] References Cited

U.S. PATENT DOCUMENTS

| | | | |
|---|---|---|---|
| 4,847,784 | 7/1989 | Clancey | 364/513 |
| 4,979,137 | 12/1990 | Gerstenfeld et al. | 364/578 |
| 5,267,865 | 12/1993 | Lee et al. | 434/350 |
| 5,311,422 | 5/1994 | Loftin et al. | 364/401 |
| 5,432,940 | 7/1995 | Potts et al. | 395/700 |
| 5,441,415 | 8/1995 | Lee et al. | 434/350 |
| 5,515,488 | 5/1996 | Hoppe et al. | 395/140 |
| 5,584,024 | 12/1996 | Shwartz | 707/4 |

Primary Examiner—Almis R. Jankus
Attorney, Agent, or Firm—Madson & Metcalf

[57] ABSTRACT

An apparatus and method adapted to select criteria for use in execution of a logical function such as a search, filter, sifting, or the like, may rely on a graphical user interface in which logical operators and Boolean operators are presented in distinct graphical locations demonstrating to an unsophisticated user the distinction between Boolean relations and logical relations. A dialogue box may include argument windows related by a logical operator button. Two corresponding arguments related by a corresponding logical operator form a logical relation. Argument windows and operator buttons may each provide a menu when selected, thus presenting options for a user to select from.

A Boolean operator may relate two logical relations in a Boolean relation. Groups of Boolean relations may be related by other Booleans in inter-group Boolean relations.

A language text equivalent (LTE) of the combination of all relations formed by a user may be presented in a language or text window within a dialogue box. The LTE provides feedback to a user, which feedback has been very reliable in clearly telling a user whether the relations produced are actually what the user seeks or needs. A user may then edit the relations until satisfied.

47 Claims, 7 Drawing Sheets

AUTOMATIC, CONTEXT-ORGANIZING, QUERY INTERFACE

BACKGROUND

1. The Field of the Invention

This invention relates to user interfaces for interacting with a computer and, more particularly, to novel systems and methods for presenting Boolean and logical decisions to users in a graphical, intuitive format.

2. The Background Art

In the technology associated with computation, and in mathematical systems that are adaptable to implementation in computers, the concepts of operations and operators are well known. Some types of operators include logical operators for indicating a logical operation, relation, or decision. Mathematical operators including addition, subtraction, multiplication, division, powers, and the like, are used in accounting, science, engineering and mathematics. Boolean operators provide a method of communication of set information about sets. For example, Venn diagrams are often used in set theory to express the concepts of inclusion, exclusion, union, intersection, and so forth among sets.

As computer use has increased, more functionality becomes more transparent to a user. Therefore, many users are adept at using computers without understanding the underlying operational concepts, mathematics, logic, and so forth. Nevertheless, users want to be able to use the capacity of computers fully.

One example in which users have difficulty directing a computer is in the area of the order of operations. For example, many applications for computers rely on search engines, filters, and the like. Search engines and filters may sort, select, sift or the like to find or present to a user certain information meeting selected criteria.

However, in mathematics, the underlying theory of sets, filters, and searches, and the order in which operations are executed, affect the result. Therefore, users must provide certain information that will determine the order of operations.

User interfaces for determining the order of operations have traditionally been difficult for users not skilled in mathematics. Moreover, the typical methodology for establishing the order of operations is a combination of defaults, augmented by the use of parentheses for grouping operations in order of priority of execution. Even users considered sophisticated in mathematical concepts may find burdensome the task of keeping track of long strings of characters containing nested sets of parentheses. Moreover, mixtures of mathematical operations from basic algebra and Boolean algebra may be very confusing.

What is needed is a method and apparatus providing a user interface that is easily (even intuitively) understood and interpreted by a user. An intuitive interface, requiring minimal documentation, that represents to a user graphical images reflecting the desires of a user, is consistent within itself, is relatable to mathematical concepts, and provides natural language feedback to a user is needed. A graphical user interface that is intuitive, verifiable, and easily edited by a user is very desirable. Such a system, offering a broad and powerful range of options in operators, ordering of operations, and combinations of logical and Boolean operators, without either overly restricting or overwhelming a user, is needed.

Unique and consistent symbology or graphics are needed in order to provide distinctions recognizable by a user and bound to mathematical operations and concepts are needed. Several popular software products provide only a single Boolean operator, of only a single sense (OR versus AND), and that is implicit, not controllable. Thus, the user has many options foreclosed. Many preparation interfaces associated with commercially available databases and search engines rely on character strings of commands, arguments, Boolean operators, logical operators, and delimiters (e.g. parentheses). Those strings take large amounts of time to construct, confuse even sophisticated users, and resemble scientific programming more closely than they do human thought and communication methods.

BRIEF SUMMARY AND OBJECTS OF THE INVENTION

In view of the foregoing, it is a primary object of the present invention to provide an apparatus and method for selecting arguments, logical operators, Boolean operators, and relations for use in execution of a logical function by a processor.

It is another object of the invention to provide a graphical user interface having an input device adapted to create a selection signal effective to identify a plurality of arguments, a logical operator signal effective to identify logical operators, and a Boolean operator signal effective to identify Boolean operators distinct from logical operators.

It is another object of the invention to provide an apparatus providing a processor connected to an input device to process logical relations related by Boolean operators in Boolean relations and to provide an output signal effective to reflect a plurality of logical relations and Boolean relations therebetween.

It is another object of the invention to provide a memory device operably connected to a processor to store data corresponding to multiple arguments, the arguments being related in relations by logical operators, and relations being related by Boolean operators, where an interface (e.g. graphical user interface, GUI, or textual user interface, TUI, etc.) presents two-dimensional, distinct, separate spatial visualizations of logical relations and Boolean relations.

It is another object of the invention to provide an apparatus for presenting a language text equivalent of a logical operator and a language text equivalent of Boolean operators, along with language text equivalents of arguments (variables) related by logical operators in logical relations, with logical relations related by Boolean operators in Boolean relations, all within the proper grammatical syntax and context of a statement in a "natural language."

It is another object of the invention to provide an apparatus adapted to receive a corrective input signal from a user reading the language text equivalent statement. The statement represents some combination of logical relations and Boolean relations graphically and individually selected by a user. The user actually inputs or selects arguments, and Boolean and logical operators for associating selected arguments.

It is another object of the invention to provide an apparatus for graphically presenting to a user a plurality of options for selecting a field name in a database, a logical operator relating the field name to a desired value, the relation created thereby being used to filter, search, or otherwise sift information in the database to find records therein having values corresponding to the desired value.

It is another object of the invention to provide an apparatus for graphically grouping inputs provided by a user into groups of logical relations related by Boolean operator in intra-group Boolean relations to form a group, and intergroup Boolean relations created by Boolean operators between groups.

It is another object of the invention to provide an apparatus using a graphical image including windows displaying logical relations related in Boolean relations, and having a text window for presenting in natural language a language text equivalent of the combination of logical and Boolean relations.

It is another object of the invention to provide an apparatus for presenting a spatial visualization of Boolean operators and logical operators in unique positions, and having unique graphical representations for clarifying to a user the distinctions between logical operators and Boolean operators, between logical and Boolean relations, between Boolean operators relating two logical relations and Boolean operators relating groups of relations, and between logical operators, arguments, and commands used in forming individual relations within a group.

It is another object of the invention, in one embodiment, to provide a method of graphically enforcing proper and separate selection of all operators (including Boolean operators and logical operators), arguments, relations, and groups of relations forming hierarchies of their order of operations.

It is another object of the invention to provide an intuitive, graphical method of presenting to a user certain options, such as selecting a database, a field name from a plurality of field names within the database, a desired value associated with a field name, and a logical operator forming a relation between the field name and the desired value.

It is a further object of the invention to present to a user a graphical user interface providing a spatial visualization of Boolean operations distinct from that of logical (e.g., classical mathematical) operations and aiding a user in creating multiple logical relations combined in groups of Boolean relations between logical relations, as well as providing Boolean relations between groups of Boolean relations, while interactively providing a language text equivalent (in a natural language) to a user. This will assist a user in modifying logical and Boolean relations to achieve a desired series of relationships and a desired order of operations in a function executed using those relationships and that order of operations.

Consistent with the foregoing objects, and in accordance with the invention as embodied and broadly described herein, an apparatus and method are disclosed in one embodiment of the present invention as including an apparatus adapted to select arguments, operations, and relations for use in execution of a logical function by a processor. The logical function may be, for example, a filter, search, sifting, finding, defining, grouping, selecting, sorting, or other operation. Certain specifications or requirements may be selected by a user as parameters or other bases for the execution of the function.

In one embodiment of an apparatus and method in accordance with the invention, a dialog window may be presented to a user for creating a filter. The dialog window may have argument windows, such as a field name window and a value window corresponding to the field name. The argument windows (field name, value) may be related by a logical operator. The logical operator may be represented by a button to interact with a user. Two arguments related by a logical operator may be defined as a logical relation. Multiple logical relations may be related by a Boolean operation represented by a button identifying a Boolean operator. A group window or group box may be created graphically to enclose a plurality of logical relations grouped in Boolean relations having the same Boolean operator used between all relations. Thus, relations in a series of logical relations may be related to one another by a series of corresponding Boolean operators represented by buttons for selecting those Boolean operators.

Groups of Boolean relations may be related by an alternate Boolean operator, represented by a button between the groups of Boolean relations. Groups of groups may be boxed together graphically for presentation to, and interaction with, a user.

An apparatus in accordance with the invention may present group windows for presenting groups of relations. Each relation may be presented as a window containing a first argument and a window containing a second argument with a button between the arguments representing a choice of operators (logical operators) relating the arguments within the windows.

At a distinct location, a Boolean button may demonstrate to a user the choice of Boolean operators relating one logical relation to another in a Boolean relation. That is, logical relations may be combined in one format, while Boolean relations between logical relations may be presented in a different format.

Likewise, whenever a Boolean operator in a series of Boolean relations, each represented by a Boolean operator, is different from the previous Boolean operator, a logical grouping should break all previous Boolean operations from the next, different Boolean operator. That is, several ANDs may be used in series to create a continually narrowing intersection of sets (relations). Similarly, a series of ORs represents a continually enlarging union of sets. In the order of operations, an AND and an OR may preferably not be grouped together in certain embodiments of the invention. One operation may occur before the other.

Therefore, whenever a user changes between an AND in a series of ANDs to an OR, all of the Boolean relations using the AND may be grouped (and must be separated according to sense), and the OR then relates the ANDed group to the next group. Likewise, if a group is created using an OR, or series of ORs, and the Boolean operator in the next Boolean relation may be an AND, the Boolean relations using the ORs may then be logically grouped. That group is related to the next group by the changed operator. This information may be graphically presented to a user to reduce complex Boolean operations to a graphical symbology on a template which is not confusing, even to unsophisticated users.

The apparatus, in one currently preferred embodiment, may include an input device to provide arguments, logical operators, Boolean operators, and the like. These operators may be used to form logical relations and Boolean relations.

A memory device may be operably connected to the processor to store data corresponding to databases. The memory device may also store data corresponding to arguments, logical operators, Boolean operators, and relations. Both relations and operations may be either logical or Boolean.

An output device may be operably connected to the processor to provide feedback to a user. The feedback may include a graphical image (whether created using a GUI, TUI, or other system) to include a two-dimensional spatial visualization of one or more logical relations. Likewise, the spatial visualization may include Boolean relations between logical relations. A logical relation may include two arguments related by a logical operator. A Boolean relation may represent two relations related by a Boolean operator. In certain embodiments, two arguments may be related by a Boolean operator. In many applications requiring Boolean operators, the arguments in a Boolean relation are themselves logical relations related to one another by a Boolean operator.

This two-dimensional spatial visualization stands in stark contrast to the conventional one-dimensional string of characters (e.g. arguments, targets, logical operators, Boolean operators, etc.) and delimiters (e.g. parentheses) used in equations and adapted to many applications in the art. A one-dimensional spatial visualization may be implemented, improving over conventional strings. However the presentation graphics may be somewhat clumsy and long compared to the two-dimensional presentation of the examples herein.

It is important to understand the use of the expression "Boolean operator" in an apparatus and method in accordance with the invention. Boolean operators are often considered to be AND, OR, and NOT. The NOT operator is sometimes thought of as an exclusionary operator. That is, those items which are NOT in some set, are outside the domain of that set. However, in a logical operation, a symbol for inequality can be used instead of a NOT. Thus, Boolean operators herein may actually be thought of as including only the Boolean AND and OR. The NOT may be thought of as being the inequality or the logical operator representing inequality.

Logical operators may typically include equality, inequality, exclusive greater than or less than, and inclusive greater than (greater than or equal to) or less than (less than or equal to). Logical inclusions such as the concept of "contains" may be represented mathematically as greater than some bound and less than some other bound.

For example, in conducting searches, creating filters, sifting through databases and the like, a user may often be interested in whether or not a string or field value contains a character, a substring, or the like. Likewise, a user may desire to know whether or not a certain date is contained within a record. A user may desire to review all records, or include all records for consideration, that have a date value within a certain range of dates. Virtually all logical operators such as these may be represented by a combination of symbols or operators representing equality, inequality, greater than, and less than, as well as the exclusionary and non-exclusionary versions of the greater than and less than concepts.

However, in natural language, a user often uses different words to describe a single operator, depending on the context of use. For example, two numbers may be equal. However, a date is not considered equal to another date in normal conversation in natural language. Rather, a date is considered to be on a certain calendar date. A day may be in a month, week, or year. Thus, a user may desire, or more-readily recognize the significance of logical operators if they are presented to a user, or at least fed back to a user, in natural language for verification.

A user may want to see whether or not the selection of certain operators has resulted in a relation desired by the user. Thus, feedback of a natural language interpretation or language text equivalent of an operator, and resulting relation, is very desirable.

In an apparatus and method in accordance with the invention, a graphical template may be presented, containing numerous windows and buttons. The windows may present optional arguments, the buttons may present optional operations, and an underlying map of hot spots may map the windows and buttons in the template to certain operations by a processor. Windows and buttons, as well as templates having underlying hot spots are well understood in the art. In an apparatus and method in accordance with the invention, however, separation of Boolean operators from logical operators in space, in symbology, and in language may clarify to a user both the significance of operations and the order of operations. This is particularly valuable to a user who is not familiar with Boolean algebra or algebra in the narrower classical sense.

An apparatus and method in accordance with the invention may employ an output device adapted to display a first argument window, second argument window, third argument window and fourth argument window in a graphic image such as a template. A processor may be programmed to bind a first argument to the first argument window and a second argument to the second argument window and so forth in a one-to-one relation upon input or selection by a user. An input device may be adapted to be effective to provide interactive selectivity of the first, second, third and fourth arguments by a user. Meanwhile, the input device maybe operably connected with the processor and the output device and a memory device to provide to a user selection of logical operators between corresponding arguments for relating the arguments in a relation. Likewise, a user may select Boolean operators between logical relations to create Boolean relations. Groups of Boolean relations may be grouped by the processor in response to certain inputs from the input device selected by a user.

A method in accordance with the invention may include selection from a graphical template, by a user, a pair of arguments and a corresponding logical operator to form a logical relation. A plurality of logical relations may be created. The user may select a Boolean operator to relate a first and second logical relation in a Boolean relation. A user may select a second Boolean operator relating a first logical relation to a second logical relation in a group of Boolean relations.

The process of creating the first logical relation, second logical relation, and so forth may be continued. Likewise, the process of creating a first Boolean relation, a second Boolean relation, and so forth may also be repeated as desired by a user.

Upon creation of a Boolean relation using a Boolean operator different from the next previous Boolean operator, a group of Boolean relations may be partitioned into a group. A group may include all Boolean relations prior to the changed Boolean relation having a single sense (AND versus OR). The opposite, or alternate, Boolean relation (AND versus OR) following a continuous sequence without change of sense may create a new group. That is, a series of arbitrary length, comprising a plurality of Boolean relations may be included in a single group, so long as all Boolean relations within the group are using the same Boolean operator.

Multiple groups may be related by Boolean operators, so long as the Boolean operators between groups are the same Boolean operator. In one embodiment of an apparatus and method in accordance with the invention, Boolean operators may be nested at any level of depth. That is, a Boolean relation within a Boolean relation within a Boolean relation may be created. In the embodiments illustrated as examples herein, two levels of Boolean operators are nested. By creating additional group boxes or groupings, additional levels of nested may be used.

For example, a user may select a database, initiate a dialog using a dialog box displayed on the screen of a monitor, and select a group of arguments from field names within the database. The user may then click on buttons to present menus for possible field names, possible desired values to correspond to the field names, and possible logical operators for relating an argument (e.g. field name) to a desired value to form a logical relation.

The user may also select or input, for any number of argument windows, arguments, such as field names and corresponding desired values related by corresponding logical operators. Pop-up or pull-down menus may be used to present options available for any window or button.

A user may then select Boolean operators for relating logical relations. A user may select groupings directly, or indirectly. That is, by changing a Boolean operator's sense, a change in groupings may be made automatically by the processor. Changes in sense of operators within a group of Boolean relations may likewise divide the group in two. The operator with the inconsistent or different sense from other operators in the original group may relate and divide the new groups. In summary, a user may interact with a graphical user interface in which Boolean operators include only an AND and an OR.

A NOT is not considered to be a Boolean operator. A NOT may be treated as an inequality, a logical operator. Meanwhile, the logical operators may include all equalities, inequalities and comparatives (greater than, less than, etc.). Thus, the order of operations may be easily determined from the graphical selections by a user of highly distinctive logical operators and Boolean operators. Also, in an apparatus and method in accordance with the invention, an output device may present a text window containing natural language or a language text equivalent of all arguments, logical relations, Boolean relations and groups. After a brief inspection of the text, a user may easily identify what button or window to interact with in the graphical user interface in order to create the proper, desired relations.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 13, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

Figure 1:
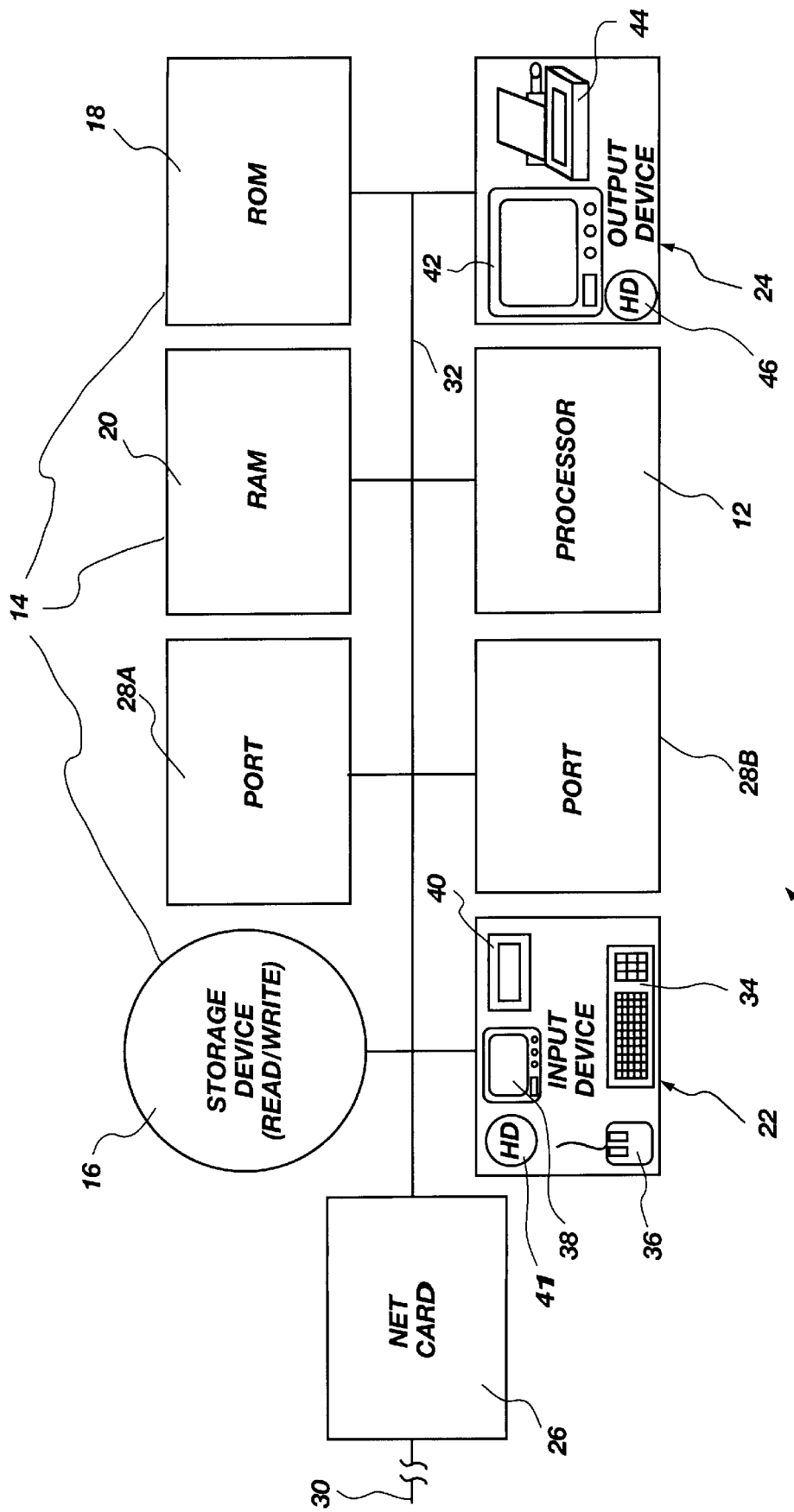
FIG. 1 is a schematic block diagram of an apparatus made in accordance with the invention.
Figure 2:
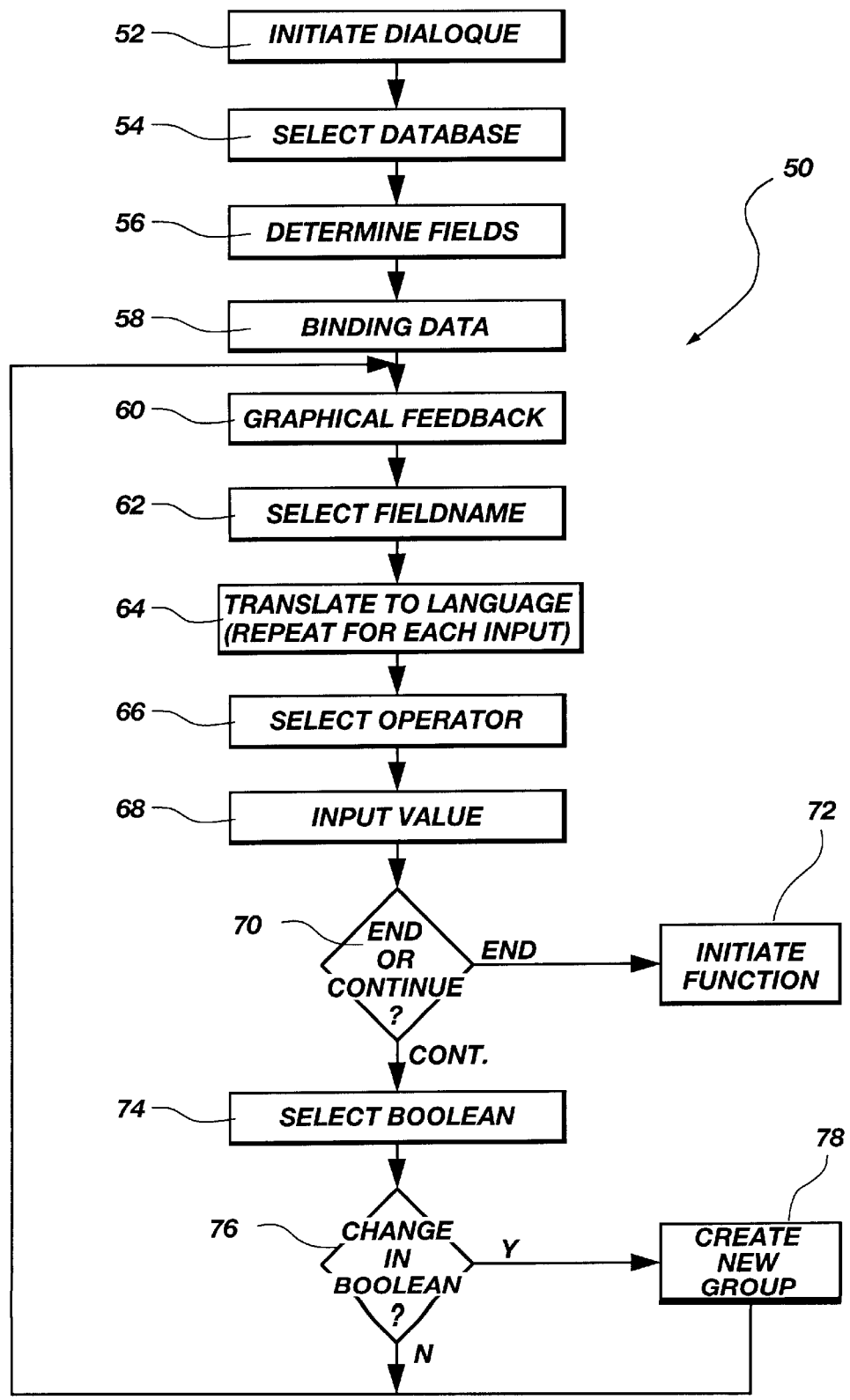
FIG. 2 is a schematic block diagram of the logic flow of a method in accordance with the invention.
Figure 3:
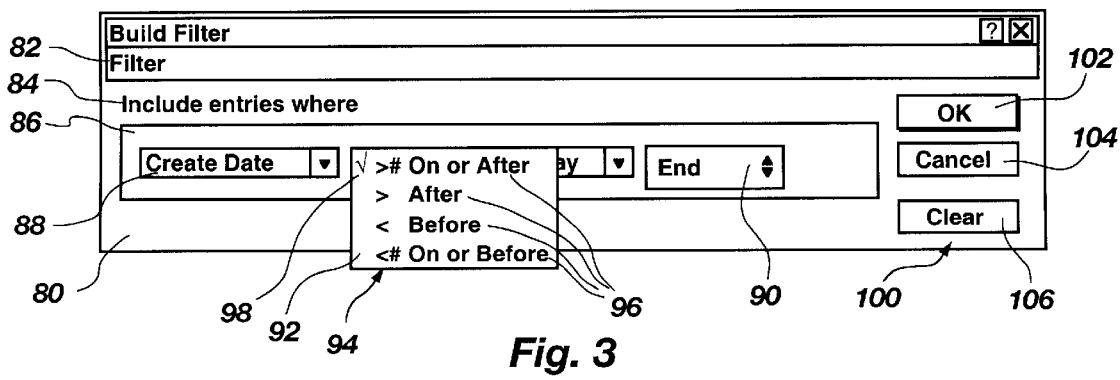
FIG. 3 is a schematic representation of a dialog box presentable to a user in accordance with the invention.
Figure 4:
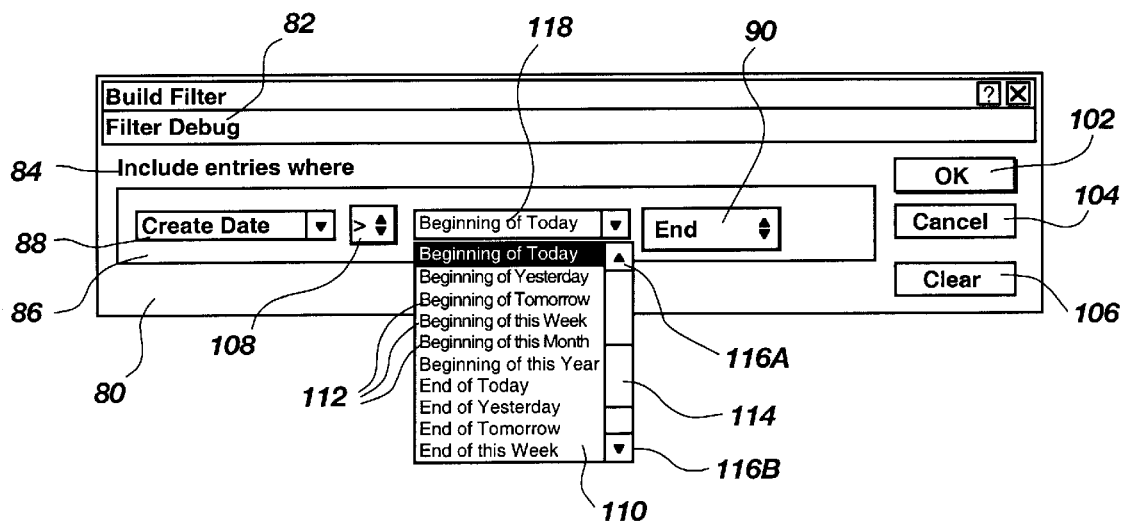
FIG. 4 is a schematic diagram of a dialog box of FIG. 3 at a different step of the process of FIG. 2.

FIG. 1 illustrates a schematic block diagram of an apparatus effective to implement an embodiment of the invention. FIG. 2 illustrates a general method in accordance with the invention. FIGS. 3–4 illustrate a screen presentable on an output device such as a monitor. Alternatively, the screen may be thought of as a window or template. The templates of FIGS. 3 and 4 illustrate selecting from menus associated with operators and menus associated with arguments.

Reference is next made to FIGS. 5–12, which illustrate in more detail one preferred embodiment of a series of templates presentable to a user by an apparatus and method consistent with the block diagrams of FIGS. 1–2. FIG. 13 illustrates a schematic block diagram of a memory device, including memory data structures for containing data to support the apparatus and method of FIGS. 1 and 2, respectively.

Those of ordinary skill in the art will, of course, appreciate that various modifications to the detailed schematic diagrams of FIGS. 1–13 may easily be made without departing from the essential characteristics of the invention, as described in connection with the block diagrams of FIGS. 1–2 above. Certain steps of the method of FIG. 2 may be added, and certain steps may be repeated or placed in another order without departing from the essence of the invention. Similarly, not all of the structures of FIG. 1 may be required in a minimal configuration of an apparatus in accordance with the invention. Likewise, the memory device of FIG. 13 may be configured with alternative data structures for preserving the essential information required by the apparatus of FIG. 1 and the method of FIG. 2 in implementing the invention.

Thus, the following description of the detailed schematic diagrams of FIGS. 1–13 are intended only as an example, and it simply illustrates one presently preferred embodiment of a schematic diagram that is consistent with the foregoing description of the invention as claimed herein.

In FIG. 1, an apparatus 10 may include a processor (a central processing unit or CPU). The CPU 12 may be connected to a memory device 14. Memory devices 14 may include one or more storage devices 16, such as a hard drive 16, a read only memory 18 or ROM 18, a random access memory 20, also referred to as operating memory 20 or RAM 20.

An input device 22 may be operably connected to the processor 12 along with an output device 24. A network card 26, or simply a net card 26, may be used to connect the apparatus 10 to the network 30. Ports 28, such as the ports 28A, 28B, may be adapted to connect the processor 12 to other peripheral devices not illustrated, but which may be selected by a user according to preference or project objectives.

In general, a reference numeral cited in a figure or text herein, such as the number 28, refers to a generic structure. The same number (e.g. 28) with a trailing letter, such as 28A, 28B, refers to a specific example of the generic structure 28. Thus, the ports 28A, 28B may simply be referred to as the ports 28, generally, and as ports 28A, 28B specifically as needed.

A bus 32 may effectively be used to interconnect the devices 12, 14, 16, 18, 20, 22, 24, 26, 28, 30. Bus design and protocol is well understood in the art.

The input device 22 may include one or more devices, such as a keyboard 34, a mouse 26, a touch screen 38, a scanner 40, a hard drive 41, or the like. As a practical matter, an apparatus 10 including a mouse 36 as an input device 22 and a monitor 42 as an output device 24 may provide for rapid, intuitive interactive operation by a user.

The processor 12 may be programmed with executables stored in a memory device 14. Likewise, a memory device 14 may include files of data for use in operating the processor 12, as well as data to be operated upon. For example, executables and process parameters may be used to operate the processor 12 in creating, adapting, editing, storing, manipulating, and searching files, such as databases, directories, documents, and the like, stored in various memory devices 14.

As a practical matter, a user may operate the processor 12. More properly, a user may interact with an application or executable running on the processor 12, to conduct the process 50 illustrated in FIG. 2.

Referring to FIG. 2, the process 50 may include an initiation step 52 or initiate 52 for the purpose of initiating a dialog. The initiate 52 or dialog step 52 may be the first step of the process 50. Alternatively, the select step 54 may occur before or after the initiate step 52. The select 54 corresponds to selection of a database or equivalent file to be operated upon by a process running on the processor 12. A process or executable may be embodied as an application, such as a search, filter, or like tool.

With a database selected 54 and a dialog initiated 52, the processor 12 may determine directly, or a user may evaluate, the fields in a database. An example of databases 300, 306 including records 304, is illustrated schematically in FIG. 13. The fields 307, 312 may be thought of as segments of information within the records 307, 308, respectively. After determination of the number, types, and sizes of the fields, the process 50 may evaluate binding data 58. The binding data step 58 corresponds to a process of looking up, calculating, or otherwise determining binding data relating to specific types of fields 310 in records 304 of databases 300.

For example, in an apparatus and method in accordance with the invention, it may be advantageous to limit the possible logical operators that may be selected by a user to correspond to a particular field 310 (argument) It may be helpful to think of the fields 310 more in terms of field name or field type since text may be handled differently than dates, which may be handled differently than accounting numbers, for example.

After determining 58 the binding data corresponding to a particular field name or field type, the processor 12 may provide certain graphical feedback to a user. The graphical feedback step 60 is illustrated in FIGS. 3–12. Graphical feedback may be in the form of a graphical image 80, which may be represented as a dialog box 80, or simply referred to as a dialog 80. Alternatively, the graphical image 80 may be thought of as a template 80.

One advantage of a template format for a graphical image 80 is the visual linking of information by a user. For example, a user, accustomed to seeing certain control buttons 91 or windows 81 (see FIGS. 3–4 for example) in certain shapes, sizes, and locations, begins to navigate spatially. Thus, the spatial relations between the windows 81 and buttons 91 may be very significant to a user navigating a spatial visualization, which may include graphics associated with a GUI or TUI, for example.

Figure 5:
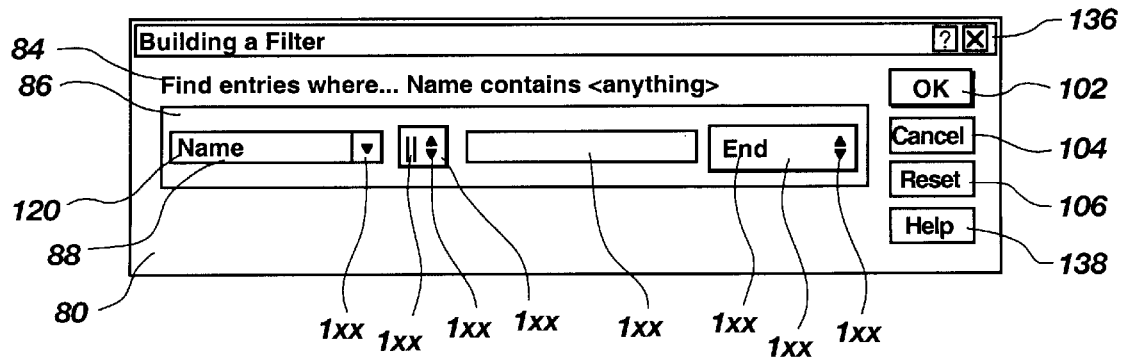
FIG. 5 is a schematic diagram of a dialog box for a user interface in accordance with the invention, illustrating selection of a field name.

The graphical feedback step 60 may be followed by a selection step 62 or select 62 in which a user may interact with the dialog 80 to select a field name (e.g., FIG. 5, field name 120). The select step 62 may be followed by a translate step 64 in which a selection by a user is translated to natural language or to a "language text equivalent" (LTE). In the case of some variables, values, fields, and the like, easily and normally represented by words, no translation may be required. On the other hand, many operations are usually (normally) represented by symbols, but may be expressed in words as well.

The translate step 64 may be repeated for any input provided by a user through an input device 22. Likewise, if certain steps are taken by a processor 12, translation of such steps to a language text equivalent (LTE, natural language translation of an operation, fact, or condition) may be provided on an output device 24, such as a monitor 42, for validation, feedback, or the like by a user.

A select step 66 may be used to select a logical operator. By logical operator in the context of this invention, is meant a logical or mathematical operator that is not a Boolean AND or a Boolean OR. That is, a Boolean NOT actually corresponds directly to a logical inequality or "not equal to." One very beneficial presentation for a user is elimination of a logical NOT from Boolean operators, and inclusion of the NOT as a logical operator, the inequality.

Thus, by Boolean operators herein are meant only a Boolean AND and a Boolean OR. The other operators are considered logical operators. Logical operators include equality, inequality, and comparatives such as exclusive greater than, exclusive less than, inclusive greater than, inclusive less than, and the like. In the art, some speak of Boolean algebra and Boolean logic. Likewise, those of skill in the art sometimes refer to logical AND or a logical OR.

Here, to emphasize the distinction and to remain consistent, logical operators refer to all operators, including those logical operators listed above, except Boolean operators AND and OR. Boolean operators herein refer exclusively to the Boolean AND and the Boolean OR.

The select step 66 may involve selection by a user of a logical operator. Again, after any selection, decision, or operation by a user or the processor 12, the translate step 64 may be repeated for any variable or parameter affected. Accordingly, upon selection 66 of an operator (e.g. logical or Boolean operator), the translate step 64 may produce a language text equivalent (LTE) for a user. The LTE may be fed back to a user through the dialog 80. Thus, in general, the translate step 64 may be repeated as often as desired or necessary within the process 50.

Logical operators may include one or more of the operators listed in Table 1.

TABLE 1

| FOR NUMERIC OPERATORS | FOR DATE OPERATORS |
|---|---|
| = Equal To | = On |
| ! Not Equal To | >= On or After |
| < Less Than | > After |
| <= Less Than or Equal To | < Before |
| > Greater Than | <= On or Before |
| >= Greater Than or Equal To | -> Within |
| = Equal to Field | <- Previous |
| ! Not Equal to Field | = On Date |
| < Less Than Field | > After Date |
| <= Less Than or Equal to Field | >= On or After Date |
| > Greater Than Field | < Before Date |
| >= Greater Than or Equal to Field | |
| | FOR GROUP |
| FOR STRING OPERATORS | And |
| | Or |
| [] Contains | Insert Row |
| |-> Begins With | Delete Row |
| = Matches | |
| | FOR NEW GROUP |
| FOR BIT FIELD OPERATORS | |
| | End |
| [] Includes | |
| ! Does Not Include | BETWEEN GROUPS |
| FOR ENUMERATION OPERATORS | And |
| | Or |
| = Equal To | |
| ! Not Equal To | |

Some typical logical operators 108 (see FIG. 4) may include, for example, equals (=), not equal to (#, or !), strictly greater than (>), strictly less than (<), greater than or equal to (>=), less than or equal to (<=), and "within" ([ ]). The "within" operator may actually be used to represent a combination of greater than one parameter and less than another, or inclusion within a set, depending on the context in which such an operator symbol is used. The parenthetical explanations in the foregoing indicate symbols that may be used to describe the logical operator functions described in text.

After the select step 66, an input step 68 may provide a value, such as a desired value to be searched for, for example. That is, corresponding to an argument related to another argument by a logical operator 108, is some value, typically, as one of the arguments. For example, if the weight of an object is equal to 100 pounds, the 100 pounds is a value, while the weight is an argument that is related to the "100 pounds" argument by an equality operator. Alternatively, for desired values over 100 pounds, a "greater than" operator may be used in a relation. The logical operator relates the two arguments.

Upon the completion of an input step 68, the user may determine whether to continue or to end. If a user determines in the decision 70 to end the development of a set of relations produced by the process 50, the initiate step 72 may initiate some logical function (e.g. executable, application, tool) using the relations created by the process 50.

For example, a search engine may be run. Once a field name and a value desired to be matched to that field name have been created with some logical operator relating them in a relation, the search engine may use the result to proceed. For example, a search engine may be told to search for all names greater than (alphabetically after or higher than) the letter "G." The relation then may direct a search engine to find in a database all fields (having the a designated field name) having a stored value beginning with a letter greater than (after) "G."

Search engines are well known in the art, as are filters and comparable systems. Likewise are parameters that may be used as a basis of search, filtering, sifting, or the like. Any logical function executed by an application running on a processor 12 may be included in the basic function initiated by the initiate step 72.

After a user has determined in the decision step 70 to continue, a user may select 74 a Boolean operator in the select step 74. That is, a user may determine to relate two relations to one another by a Boolean operator, such as an AND or an OR. Since the process 50, between the select step 62 and the select step 74, may be repeated some arbitrary number of times, a user may desire to group certain relations.

Within grouped Boolean relations, a Boolean must not change. That is, a Boolean operator such as an AND may be repeated between logical relations to form a group of Boolean relations. However, from the standpoint of operations, all Booleans must be the same within a group.

For example, a computer cannot decide whether to do an AND before an OR. Having the same hierarchical order of operation, the operators must be distinguished. Therefore, in a method and apparatus in accordance with the invention, the decision 76 of FIG. 2 may be executed by the processor 12 if a Boolean selected in the select step 74 is different from previous Booleans within the same group. The processor 12 may determine that a new group must be created because the last Boolean selected is different than those previous, within the group. Accordingly, the create step 78 may be executed by the processor 12 automatically, or may be executed by a user (initiated or selected by a user), as a result of the decision 70. FIGS. 9–12 illustrate some of the options available for grouping Boolean relations between logical relations.

If the decision step 76 results in an affirmative response, the Boolean operator from the select step 74 is different from those previous within the group. Accordingly, the create step 78 may next be executed. Alternatively, if the Boolean in question remains the same as the immediate previous Booleans, then the process 50 may return to the step 60 or the step 62, the graphical feedback step 60 or the select step 62.

As a practical matter, the graphical feedback step 60 bears a certain relationship to the translate step 64. The graphical feedback step 60 may be repeated, reiterated, updated, or the like at any time warranted by additional inputs, outputs, status changes or the like. Thus, it may be appropriate that the graphical feedback step 60 may be thought of as an output 60 of the status of the process 50.

For example, the initiate step 62 may present a dialog box 80 to a user immediately. This may be thought of as graphical feedback, although no decisions have been made by a user other than that of determining to proceed with the process 50. Thus, in general, the graphical feedback step 60 and the translate step 64 may be repeated or positioned anywhere within the process 50 as appropriate to provide graphical interaction and feedback of a "language text equivalent" to a user.

Referring to FIGS. 3–4, a dialog 80 or box 80 or template 80 may be presented to a user by an output device 24 such as a monitor 42. (See FIG. 1 for hardware). A dialog may contain several windows 81 generally. The windows 81 may be interactive, both presenting information to a user, and being active to receive inputs. Similarly, the dialog 80 or template 80 may include buttons 91.

In one embodiment of an apparatus 10 and method 50 in accordance with the invention, a menu options bar 82 may be presented for identifying pull-down menus for interaction with the system underlying or driving the template 80. For example, saving work, copying work, editing, and the like may be implemented as in other apparatus known in the art, by means of a menu options bar 82.

A window 84 or a text window 84 may be presented in the template 80 for presenting prompts and language text equivalents of operations, inputs, outputs and the like. The contents of a window 84 may be thought of as a natural language interpretation of the processes 50 or the steps within a process 50 executed either by a user or the processor 12.

Figure 7:
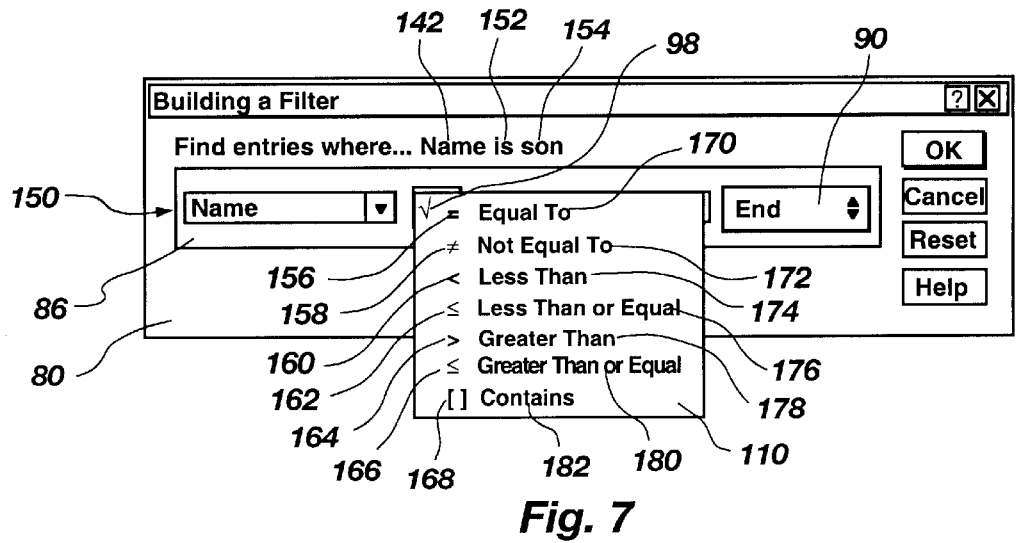
FIG. 7 is a schematic diagram of a dialog box for a user interface in accordance with the invention, illustrating a menu of logical operators.

A group 88 may be represented by a box 88 surrounding a relation 150 or a group 86 of relations 150 (see also FIG. 7). Certain arguments 120 may be displayed, selected, or input into windows 88. For example, the window 88 of FIG. 3 may be thought of as a field name window for displaying a selected field name corresponding to field names within a data base 300, 306.

In general, an argument 87 or first argument 87 in a window 88 is related to another argument 89, or second argument 89 in another window 119 by a logical operator 94 to form a logical relation 150. One or more relations 150 may be combined by a Boolean operator 95, between each adjacent pair of logical relations 150, to form a Boolean relation 151. Trailing alphabet characters following reference numerals indicate specific examples of the generic structure associated with the numeral. Thus, 151A, 151B, 151C, etc. (see FIGS. 10–12), are specific examples of a generic Boolean relation 151. A Boolean operator 95, such as the Boolean operator 216, forming a Boolean relation 151A within a single group 86 (see FIG. 10) may be thought of and referred to as an intra-group Boolean operator 95. The relation 151A is an intra-group Boolean relation. By contrast a Boolean operator 95, such as the Boolean operator 228 of FIG. 11 between different groups 86, 230 (see FIGS. 11–12) may be thought of, and referred to, as an inter-group type of Boolean operator 95, forming an inter-group Boolean relation 151B.

Buttons 91, generally, and the specific button 90, may be used for exercising certain interactive controls over the apparatus 10. The button 90 may be used to enter a command to end or continue. The button 90 may be thought of as a decision button 90 for permitting a user to elect whether or not to proceed, and if to proceed, then how to proceed.

Upon selection, by a user, of any window 88, the processor 12 may display a menu 92 generally. In the menu 93 of FIG. 3, operators 94 are displayed, or symbols 94 corresponding to logical operators are displayed. In FIGS. 3–4, the operators 94 correspond to logical operators to be used in forming relations between the arguments presented in the windows 88, 119.

Referring still to FIGS. 3–4, a prompt 96, text interpretation 96, or language text equivalent 96 may be presented within the menu 92 corresponding to the logical operator 94 (or any menu 93). A pointer 98 or marker 98 may indicate to a user which of the logical operators 94 has been selected for forming a relation between the contents of the windows 88, 119. Buttons 100 may be thought of as control buttons. For example, it has been found effective to have an okay button 102 for selection by a user indicates that the processor 12 may initiate some logical function, operation, or executable using the contents (parameters, relations) provided by the dialog 80. That is, the interaction of a user with the dialog 80 is completed satisfactorily.

The cancel button 104 may be used to indicate that a relation being built by a user should be canceled. Alternatively, it may be used to indicate that the entire contents of a dialog 80 should be eliminated to be rebuilt by a user. The clear button 106 may be used to indicate clearance of all contents of the dialog 80.

The button 108 of FIG. 4 represents a logical operator 94. That is, a user may select the button 108. Selection may actually be activation of a hot spot corresponding to the spatial location of a button 108 (or any button 91), activating an executable linked to the hot spot, which executable may present a menu 92 (or any other corresponding graphic or interactive element, for another hot spot). That is, a graphic may have an underlying hot spot having an underlying executable, which may present another graphic or perform any executable function, including nesting this process of interaction.

Likewise, by selecting the window 119, a user may activate a hot spot recognized by the processor 12 and resulting in presentation of a menu 110. The menu 110 may be thought of as a value menu 110 or a desired value menu 110. The value menu 110 may include entries 112 which may serve as prompts or options, corresponding to arguments, to be selectable by a user. In the window 119 is presented a value 118 that represents the current selection from the menu 110.

To navigate a menu 93, a scroll bar 114 including arrows 116 such as the up arrow 116A and down arrow 116B may be provided. A user may thus scroll through all the available options 112 presented by the window 119, selecting a value 118 to be presented in the window 119.

In another example, FIGS. 5–12 illustrate how a user may construct relations 150 using arguments related by logical operators. Also, a user may create Boolean relations 151 using Boolean operators. Referring to FIGS. 5–12, a field name 120 may be presented in a window 84 as an argument 120. A scroll button 122 may enable a user to change the selected field name 120. A button 124 or a logical operator button 124 (generally, 94) may represent interaction with a logical operator (e.g. 156–168) for selection of an appropriate logical operator for forming a relation 150. A logical operator 126 or indicator 126 may show the symbol 94 of a selected logical operator 94. The terms indicator 126 and logical operator 126 may be used interchangeably, as may operator 94 and symbol 94, since each reference numeral and corresponding names are simply a reference to the same abstraction, in each case. Alternatively, an indicator 126 may indicate, or be thought of as indicating, the status of a logical operator 94. Another indicator 128 may indicate the status of a scrolling feature.

A value window 130 may be presented to correspond to a window 88. That is, the contents of a value window 130 constitute a second argument in a relation 150 including the first argument 120 related by the logical operator 126. In FIG. 5, the indicator 126 shown is an "include" operator.

A status prompt 132 or indicator 132 may indicate the status of underlying operations controlled by the button 90 or end button 90, sometimes referred to as a decision button 90. The indicator 134 may indicate the selected operation or the status, as shown, but other options may be scrolled for review. In the configuration illustrated in FIG. 5, a button 136 for closing interaction with the dialog 80 and a button 138, for soliciting help in navigating the decisions of the dialog 80, may be included.

Also, a button 139 may be included for context-sensitive help. That is, selection of the button 139 may change the nature of a cursor associated with the mouse 36 (or other pointer) and monitor 42. When the button 139 is activated, selection of any displayed window 93 or an element of its contents may result in presentation of helpful information associated therewith.

Figure 6:
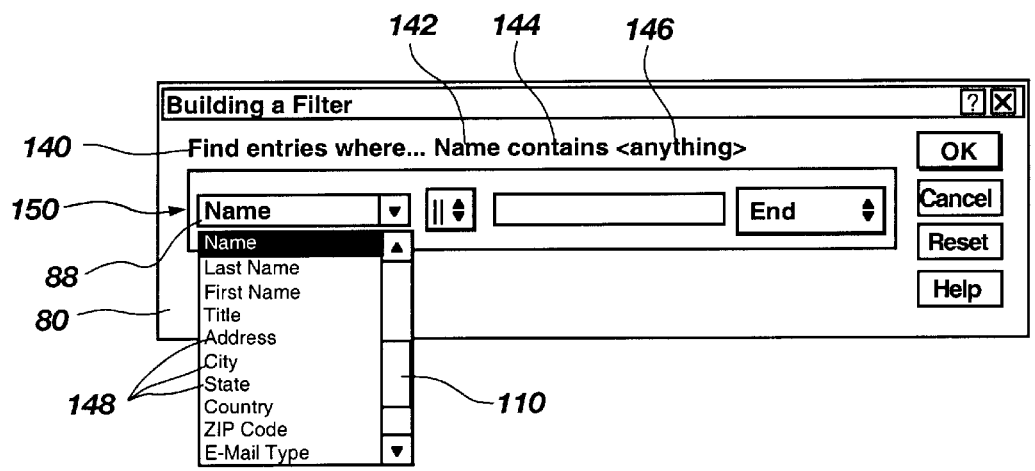
FIG. 6 is a schematic diagram of a dialog box for a user interface in accordance with the invention, illustrating a menu of field names.

Referring to FIG. 6, a prompt 140 may be included in the window 84 used for language text equivalents 85 of relations 150, 151. A field name 142 corresponds to the contents of the window 88 in natural language. In the illustrated example, no translation is required. However, many applications require, or customarily use, cryptic, coded, shorthand, numerical, or other names for fields. Thus, a language text equivalent 85 (LTE) for the field name 142 may be presented in the window 84.

The LTE 144 is the language text equivalent of the logical operator selected with the button 124. The prompt 146 is a language text equivalent 146 for the current argument corresponding to the value window 130. Since no value 190 has been selected, the value window 130 is empty and the language text equivalent 146 indicates a prompt, telling a user that no selection has been made.

Referring to FIG. 7, the LTE 152 corresponds to the logical operator 156 (94). In general, one may speak of a logical operator 156 (94) or a logical operator symbol 156 (94) since both are simply representations to a user of an underlying logical operation. The logical operating symbols 158–168 correspond to logical operations available in the dialog 80 of FIG. 7. The text interpretations 170–182 explain the significance of the logical operator symbols 156–168, respectively. The text interpretations 170–182 may be used, in certain circumstance, directly as the language text equivalents 85 for the window 84.

Figure 8:
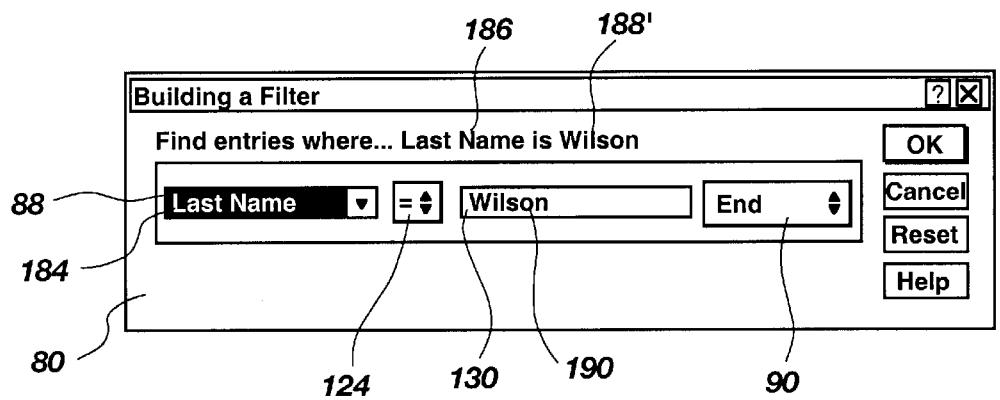
FIG. 8 is a schematic diagram of a dialog box for a user interface in accordance with the invention, illustrating selection of a value of a field name.

Referring to FIG. 8, a field name 184 has been selected in the dialog 80. The language text equivalent 186 of the field name 184 is presented in the window 84 (see FIG. 5). Meanwhile, a language text equivalent 188 corresponding to a desired value 190 is likewise presented. In many circumstances, the language text equivalents 186, 188 may be identical to their field names 184, desired values 190. As mentioned above, this is not necessarily the case, although illustrated as such in this example.

Figure 9:
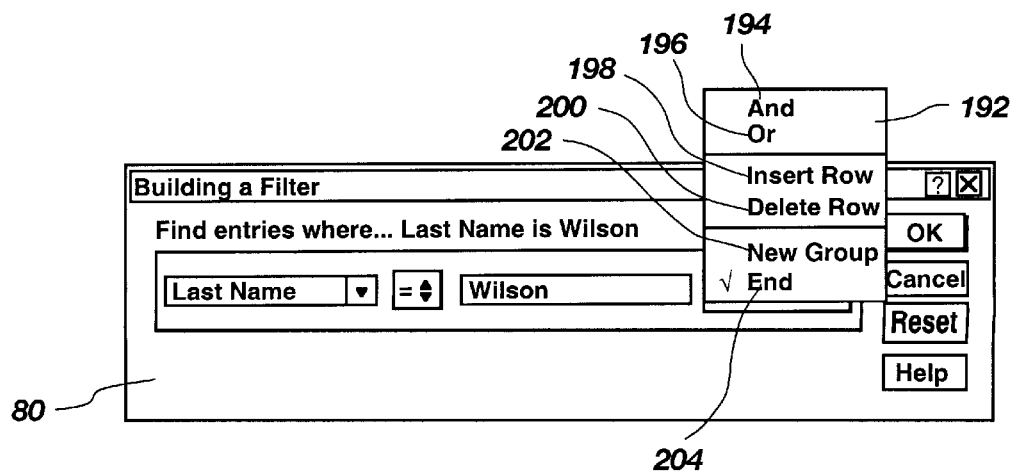
FIG. 9 is a schematic diagram of a dialog box for a user interface in accordance with the invention, illustrating a menu of decision options and Boolean operators.
Figure 10:
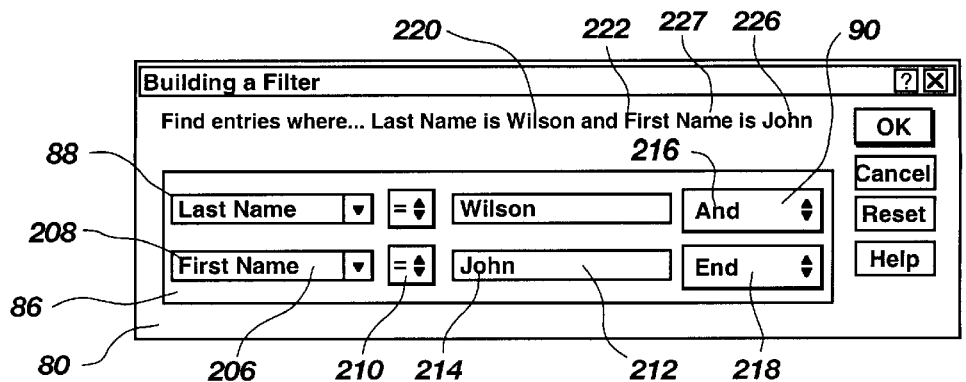
FIG. 10 is a schematic diagram of a dialog box for a user interface in accordance with the invention, showing an additional relation including a field name and a desired value corresponding to the field name.

Referring to FIG. 9, selection of the button 90. illustrated in FIG. 8, causes presentation of a menu 192 presenting options 194–204 or entries 194–204. The Boolean AND 194, or the Boolean OR 196, may be selected by a user to connect the logical relation 150 to another logical relation 150. For example, the relation 150C of FIG. 10 is an example. The Boolean relation 151A is graphically represented by the box 86 or group 86.

The insert 198 and delete 200 may be used to add or eliminate, respectively, a logical relation 150 (e.g. 150B), thus editing the process 50. The "new group" command 202, or menu option 202, may be used to indicate a changing of grouping, occasioned by a change in Boolean, or a change in the order of operations. Alternatively, a group 86 or grouping 86 may be attempted improperly by a user.

For example, referring to FIG. 10, the button 218 may be used to select one of the Booleans 194, 196 (Boolean operators) different from the Boolean 216. A new group, such as the group 230 of FIG. 11, may be created automatically by the processor 12 in such a case.

The end 204 when selected as illustrated in FIG. 9, is an affirmative indication by a user that no further editing is desired within the template 80. Selecting the okay button 102 may have the same effect of terminating editing.

Referring now to FIG. 9, the insert 198 may be thought of as a command creating a logical relation 150. Likewise, the delete 200 may be thought of as a command destroying a logical relation 150 or removing it. The "group" command 202 may be thought of as creating an inter-group Boolean 228. That is, selecting the group command 202 effectively creates another group (e.g. 230 in FIG. 12) related to an initial group (e.g. 86 in FIGS. 11–12) by some Boolean operator (e.g. 228 in FIGS. 11–12).

Figure 11:
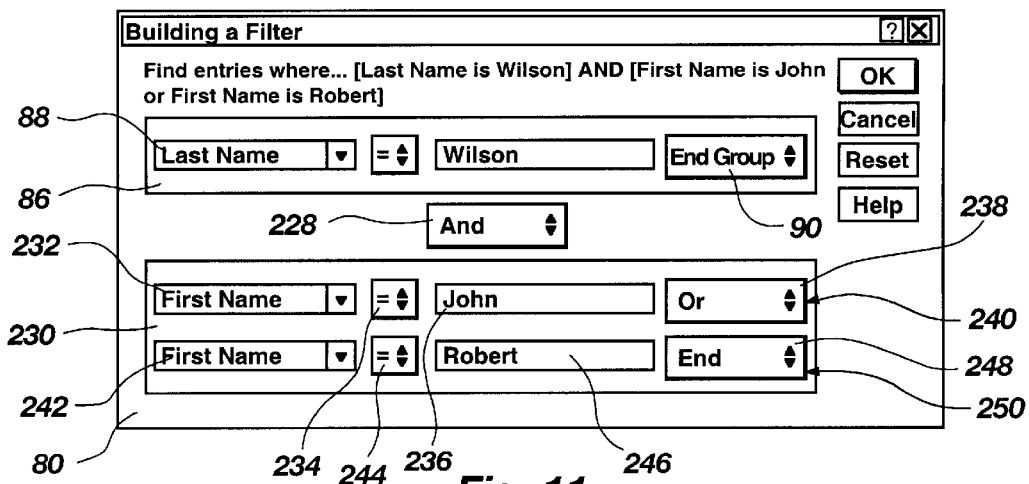
FIG. 11 is a schematic diagram of a dialog box for a user interface in accordance with the invention, illustrating groups of relations related by Boolean operators.
Figure 12:
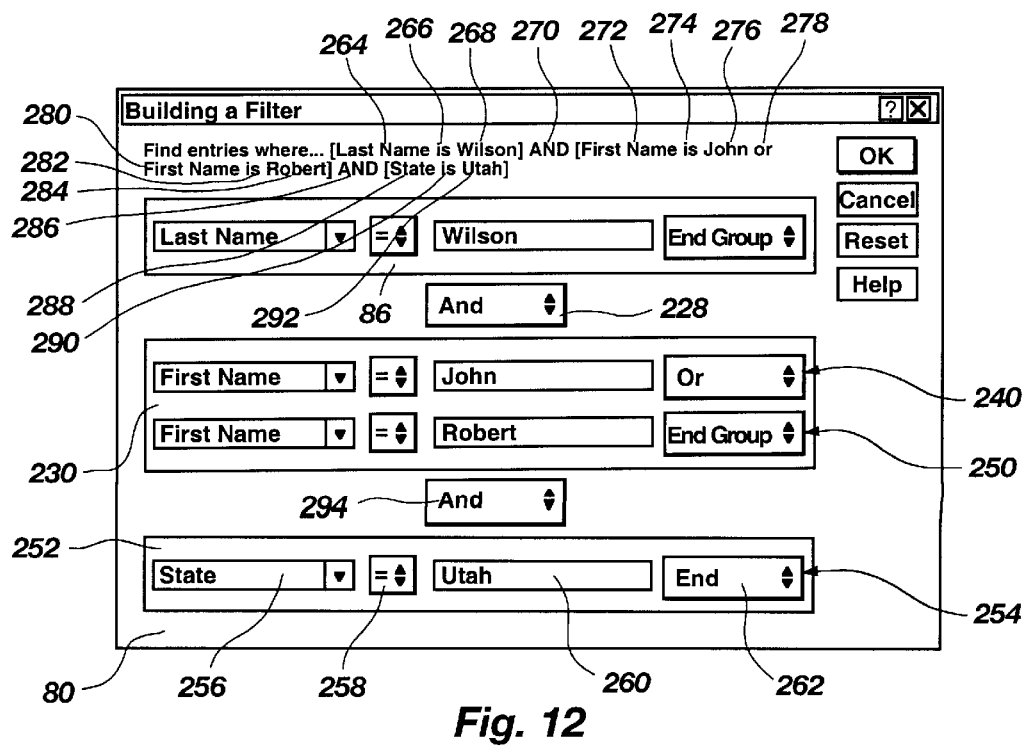
FIG. 12 is a schematic diagram of a dialog box for a user interface in accordance with the invention, showing multiple groups related by multiple inter-group Boolean operators, with intra-group Boolean operators, of opposite sense from inter-group Boolean operators, relating the logical relations to one another within a group.
Figure 13:
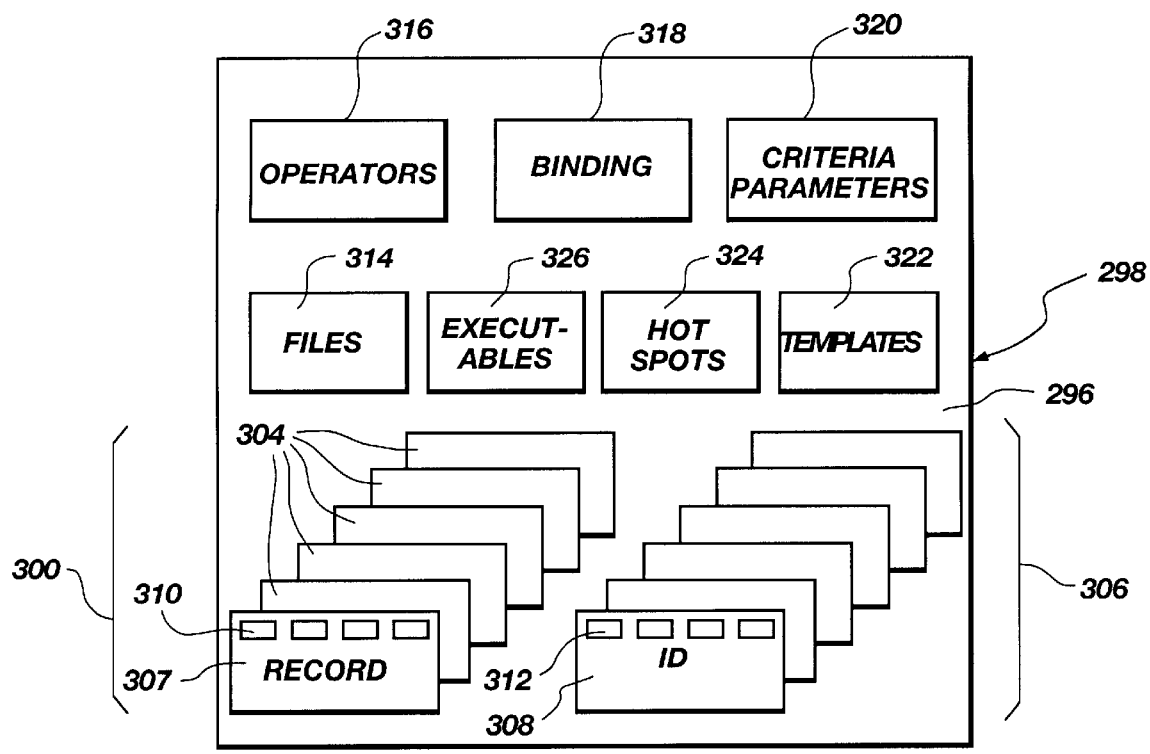
FIG. 13 is a schematic block diagram of a memory device, including databases of records and files of operating information, for an apparatus and method in accordance with the invention.

Referring now to FIGS. 5–12, and more particularly to FIGS. 10–12, a window 206 may be created to contain an additional field name 208. Another button 210 may be used to represent, and to provide interaction with, a logical operator 211 relating the value 214, in the window 212 or value window 212, to the field name 208 in a relation 150A. Meanwhile, the button 90 of FIG. 10, and more particularly the Boolean operator 216 relate the logical relation 150A and the logical relation 150B in a Boolean relation 151A. Thus, a relation 150, in general, may be thought of as a logical relation between two arguments related by a logical operator. A Boolean relation 151 may be thought of as a relation established by a Boolean operator between two logical relations 150.

Referring again to FIGS. 5–12, and more particularly to FIGS. 10–12, a window 206 corresponding to a field name 208 may graphically represent a logical relation 150B when combined with a window 212 containing a value 214 or desired value 214 related by a logical operator 211.

A Boolean operator 216 may relate the logical relation 150A to the logical relation 150B in a Boolean relation 151A. Thus, the Boolean operator 216 may be thought of as an intra-group Boolean operator within the group 86 (see FIG. 10). A user may interact with the button 218 to determine whether to end, continue, or otherwise edit the relations 150A, 150B, 151A within the template 80 or dialog 80.

Meanwhile, still referring to FIG. 10, the language text equivalent (LTE) 220 of the logical operator 216 may be presented in the window 84. Meanwhile, the LTE 222 of the field name 208 and LTE 224, corresponding to the logical operator 211 associated with the button 210, may be displayed graphically to a user. The LTE (language text equivalent) 226 corresponding to a desired value 214 may complete the logical relation 150B.

Referring now to FIGS. 10–11, a user may select a grouping option using the button 90. Thus, the Boolean relation 151A may be altered directly by addition of a logical relation 150C. Thus, in general, a Boolean operator 95 (e.g. 228) may relate a group 230 to a group 86. The window 232 corresponds to the window 206 in the Boolean relation 151A of FIG. 10.

However, by addition of the logical relation of 150C relating the field name 242 to the field value 285 in the window 246, and by invoking the Boolean operator 279 different from the Boolean operator 228, the group 230 may be created automatically. That is, the button 234 establishes a logical relation 150B relating the contents of the windows 232, 236. The logical relation 150B may be related to the relation 150A by the Boolean operator 216. However, addition of the Boolean operator 279 (see FIGS. 11–12), of opposite sense from the Boolean operator 216, may require a new group to be created, rendering the Boolean operator 228 an inter-group Boolean operator. Meanwhile, the button 238 corresponding to an intra-group Boolean operator 279 establishes the Boolean relation 151C between the logical relation 150B and the logical relation 150C.

The window 242, button 244, and window 246 may be added by the same selection process or step that provided the Boolean relation 151C. That is, if the button 238 was not operated to create the end of a group 230, and no change of sense occurs in the Boolean 279, the logical relation 150C may be established.

Referring to FIG. 12, the group 252 may be added, forming the logical relation 150D. The logical relation 150D relates the contents of the windows 256, 260 with the selection from the button 258. In the example shown, the button 262 has been selected or defaulted to an end condition terminating preparation of the relations 150, 151.

Reviewing the relations 150, 151 of FIGS. 10–12, one may note that the language text equivalent 264 or LTE 264 corresponds to a field name 265 as displayed in the window 88. The LTE 266 corresponding to the logical operator 267 operates as a verb forming a sentence with the LTE 268 corresponding to the desired value 269. Likewise, the LTE 270 corresponding to the Boolean operator 271 operates as a conjunction in a language equivalent sentence.

The LTE 272 corresponding to the field name 273 also happens to be identical to the field name 273 in this example. As explained earlier, this may not be the case in all embodiments. Nevertheless, descriptive titles of field names may be useful as text for natural language representations of relations. The LTE 274 corresponding to the logical operator 275 forms another clause, by serving as another verb. In the clause, the LTE 276 corresponding to the desired value 277 is the predicative adjective of the nominative 272 (LTE 272 corresponding to field name 273) in this example. Other grammatical constructions with other parts of speech may be similarly related in language text equivalents of relations 150, 151 created by a user.

The LTE 278 corresponding to a logical operator 279 forms a conjunction within the sentence. Thus linked, are another nominative 280 or LTE 280 in a clause, and a verb, the LTE 282 corresponding to the logical operator 283.

The LTE 284, corresponding to the desired value 285, forms a predicative adjective with respect to the LTE 280 as nominative, related by the verb 282 or LTE 282. The LTE 286 corresponding to the Boolean operator 287 forms another conjunction in the language interpretation of the relations 150, 151. The LTE 288 corresponding to the field name 289 forms another nominative 288 in a clause 150D corresponding to a relation 150D. The LTE 290 corresponding to the logical operator 291 forms the verb identifying the predicative adjective 292 corresponding to the desired value 293.

In summary, a user may create any number of logical relations 150 and Boolean relations 151 by selection of arguments 87, 89 related by logical operators 94 to form the logical relations 150. Similarly, any number of logical relations 150 may be related by Boolean operators 95 in Boolean relations. Boolean relations may be grouped in order to control the order of operations. One will note that Boolean operators 95 may be created to appear different in size, shape, and location from logical operators 94. Also, logical operators may be made mutually exclusive of Boolean operators. The graphical presentation, along with removal of the Boolean NOT, as a Boolean, contribute to the clarification and intuitive nature of the template 80.

Referring now to FIG. 13, in one embodiment of an apparatus and method in accordance with the invention, a memory device 14 of FIG. 1 may be configured as the memory device 298 containing a certain memory block 296 containing data. The memory block 296 may include a database 300 comprising records 302, 304.

In general, additional databases 306 comprising records 308, 304 may also be included in the memory block 296 or other memory blocks 296. In one embodiment, the fields 310, 312 corresponding to the records 302, 308, respectively, may contain information to be searched, filtered, sifted, or the like by some application running on the processor 12.

Files 314 may be stored in the memory block 296 to maintain data and executables 326 associated with operation of an apparatus 10 and method in accordance with the invention. For example, the logical operators 94 may be maintained in files 316. Within the files 316, or in a separate file 318, binding data 318 may be contained identifying the conditions under which certain logical operators 94 may be used to form relations 150.

Similarly, various parameters for use by executables 326 may be stored in a criteria file 320. These criteria files of parameters may be used by the processor 12 for making decisions, determining displays, presenting options to a user, and otherwise limiting the information presented to a user in the template 80. Parameters in the criteria file may control of support an operation using the relations of the method 50. Also, the method 50, itself, may rely on the stored parameters. That is, many options exist for using and combining logical and Boolean operations. A programmer may cause many of the options to be unavailable when certain other options have been exercise. For example, only certain operators may be selectable for a given field name. Thus no clutter is left in the template 80 to confuse a user and reduce the effectiveness of a user in making decisions.

A file 322 storing template graphics may be used by the processor 12 to create the graphical objects corresponding to windows 88, buttons 90 and the like. In general, a template 80 may present a graphical image to a user. Underlying the graphical image of a template may be hot spot maps 324. For example, when a user selects a button 91, the designation of the button 91 by a user using a cursor or other indicating input device 22, is activating a hot spot corresponding to the shape, size or the like of the button 91.

Hot spot maps are well known in the art. Hot spot maps may change as the graphics of a graphical image change. Thus, hot spots may change with time and place as needed. In an apparatus and method in accordance with the invention, hot spot maps 324 may be stored as a file 324.

Thus, the template 80 or any portion of its constituent parts, may be stored in the file 322 of template graphics 322. The file may have related, bound, or otherwise underlying hot spot maps 324. The hot spot maps 324, in turn, may have underlying executables 326 stored in a file 326 of executables 326. That is, for example, selection of a button 91 by a user, may cause presentation of a menu 93. Nevertheless, the processor 12 must generate, output or otherwise control presentation of the menu 93.

Some underlying executables 326 provide the processor 12 with instructions to read inputs from an input device 22 and produce outputs from an output device 24 in accordance with the template 80 and its associated template graphics 322, hot spot maps 324 and executables 326.

From the above discussion, it will be appreciated that the present invention provides an apparatus and method adapted to select criteria for use in execution of a logical function such as a search, filter, sifting, or the like, may rely on a graphical user interface in which logical operators and Boolean operators are presented in distinct graphical locations demonstrating to an unsophisticated user the distinction between Boolean relations and logical relations. A dialogue box may be presented on a screen of a monitor.

The dialogue box may include argument windows on opposite sides of an operator button, or logical operator button. Two arguments related by a logical operator form a relation. Each argument window may provide a menu when selected, thus presenting options for a user to select from. Alternatively, a user may input into an argument window, a desired argument. Similarly, a logical operator button may present a menu of options corresponding to, and allowed in conjunction with, a selected argument.

A Boolean operator may relate two logical relations. A Boolean operator is positioned in a different location, and may also be presented as a menu of choices permitted. Groups of Boolean relations may include a series of logical relations related by Boolean operators. A group of Boolean relations may be grouped when a different Boolean operator is used than that of the previous one or several Boolean operators.

A language text equivalent (LTE) of the combination of all relations formed by a user may be presented in a language or text window within the dialogue box. The LTE provides feedback to a user. This feedback has been very reliable in clearly telling a user whether the relations produced are actually what the user seeks or needs. A user is thus prompted to edit relations created until the user is satisfied.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus adapted to select criteria for use in execution of a logical function by a processor, the apparatus comprising:

an input device adapted to provide input signals selected directly by a user, the input signals comprising:

a selection signal effective to identify a first argument, a second argument, a third argument, and a fourth argument, a logical operator signal effective to identify first and second logical operators, the first logical operator being effective to logically relate the first argument to the second argument in a first logical relation and the second logical operator being effective to logically relate the third argument to the fourth argument in a second logical relation, and a Boolean operator signal effective to identify a Boolean operator effective to relate the first logical relation to the second logical relation in a Boolean relation;

a processor operably connected to the input device to process the first logical relation, second logical relation, and Boolean relation, and to provide an output signal to an output device, the output signal being effective to reflect the first logical relation, second logical relation, and Boolean relation;

a memory device operably connected to the processor to store data corresponding to the first, second, third and fourth arguments, the first and second logical operators, and the Boolean operator; and the output device, operably connected to the processor and effective to feed back to a user a graphical image comprising a spatial visualization of the first logical relation, second logical relation, and the Boolean relation, in response to the output signal.

2. The apparatus of claim 1, wherein the graphical image further comprises a spatial visualization of the first argument and second argument related by the first logical operator, the third argument and fourth argument related by the second logical operator, and the first logical relation and second logical relation related by the Boolean operator.

3. The apparatus of claim 1, wherein the output device is further effective to feed back, in a natural language syntax, an interpretation of the first logical relation, second logical relation, and Boolean relation.

4. The apparatus of claim 3, wherein the interpretation comprises a single statement in a correct grammatical context.

5. The apparatus of claim 3, wherein the input device is adapted to receive a corrective input signal, the corrective input signal reflecting a response of a user to a comparison of the interpretation and the graphical image, and wherein the processor is programmed to process the corrective input signal and change, in accordance therewith, a relation selected from the first logical relation, the second logical relation, and the Boolean relation.

6. The apparatus of claim 5 wherein the input device is further adapted to receive another input corresponding to a fieldname, another logical operator corresponding to the fieldname, and a fieldvalue related to the fieldname by the other logical operator in another logical relation.

7. The apparatus of claim 6 wherein input device is further adapted to receive:

a grouping input effective to instruct the processor to group the first logical relation and second logical relation in a first group, with the other logical relation in a second group;

another Boolean input corresponding to another Boolean Operator effective to create another Boolean relation between the first group to the second group.

8. The apparatus of claim 7 wherein the output device is further adapted to feed back to a user a graphical group image comprising a spatial visualization of the first group, the second group, and the other Boolean relation.

9. The apparatus of claim 1 wherein:

the input device is adapted to provide to the processor inputs corresponding to:

a first Boolean group, the first group comprising a first arbitrary number of logical relations comprising the first arbitrary number of second selected fieldnames, related to the first arbitrary number of second selected fieldvalues by the first arbitrary number of second selected logical operators, and a first corresponding number of Boolean operators forming the first corresponding number of Boolean relations between first relations of the first arbitrary number of logical relations;

a first grouping signal effective to group the first Boolean group;

a second Boolean group, the second group comprising a second arbitrary number of logical relations comprising the second arbitrary number of second selected fieldnames, related to the second arbitrary number of second selected fieldvalues by the second arbitrary number of second selected logical operators, and a second corresponding number of Boolean operators forming the second corresponding number of Boolean relations between second relations of the second arbitrary number of logical relations;

a second grouping signal effective to group the second Boolean group;

a group Boolean operator effective to relate the first Boolean group to the second Boolean Group.

10. The apparatus of claim 1 wherein the graphical image further comprises a Boolean graphic, first logical graphic, and second logical graphic, mutually distinct from one another, the Boolean graphic corresponding to the Boolean relation, the first logical graphic corresponding to the first logical relation, and the second logical graphic corresponding to the second logical relation.

11. The apparatus of claim 10 wherein the spatial visualization is a two dimensional image.

12. The apparatus of claim 10 wherein the graphical image further comprises a text window displaying a natural language representation of the first relation, second relation, and Boolean relation.

13. The apparatus of claim 1 wherein the first and third arguments are selected from fieldnames in a database, and the second and fourth arguments are selected to correspond to fieldvalues.

14. The apparatus of claim 1 further comprising the processor programmed to execute a logical function using the first logical relation, second logical relation, and Boolean relation.

15. The apparatus of claim 1 wherein the memory device is further adapted to store a plurality of records, each record of the plurality of records comprising a plurality of fields, each field of the plurality of fields having associated therewith a fieldname, a fieldtype bound to the fieldname, and a fieldvalue, and wherein a first fieldname of the fieldnames is adaptable to be selected as the first argument, and a second fieldname of the fieldnames is adaptable to be selected as the third argument.

16. The apparatus of claim 15 wherein the memory device is further adapted to store a first desired fieldvalue and a second desired fieldvalue, adaptable to be selected as the second and fourth arguments, respectively.

17. The apparatus of claim 16 wherein the processor is further adapted to execute a logical function using the first logical relation, second logical relation, and Boolean relation.

18. The apparatus of claim 17 wherein the logical function comprises a comparison of a fieldvalue contained in the plurality of records with the first desired fieldvalue.

19. The apparatus of claim 1 wherein the memory device is further adapted to store a template corresponding to the graphical image, the template identifying locations of the first logical relation, second logical relation, and Boolean relation in two dimensions.

20. The apparatus of claim 19 wherein the template is further adapted to identify locations of a first logical operator graphic corresponding to the first logical operator, second logical operator graphic corresponding to the second logical operator, and Boolean graphic corresponding to the Boolean operator.

21. The apparatus of claim 20 wherein:

the processor is further programmed to bind the first logical operator graphic, second logical operator graphic, and Boolean graphic to first, second, and third input regions displayable by the output device; and the input device is adapted to be effective, in combination with the first, second, and third input regions, to provide interactive selectivity of the first logical operator, second logical operator, and Boolean operator, respectively.

22. The apparatus of claim 21 wherein:

the output device is adapted to display a first argument window, second argument window, third argument window, and fourth argument window in the graphic image;

the processor is further programmed to bind the first argument to the first argument window, second argument to the second argument window, third argument to the third argument window, and fourth argument to the fourth argument window; and the input device is adapted to be effective, in combination with the first, second, third, and fourth argument windows to provide interactive selectivity of the first, second, third, and fourth arguments, respectively.

23. An apparatus comprising a processor, an input device operably connected to the processor, an output device operably connected to the processor, and a memory device operably connected to the processor, the memory device comprising:

an argument block adapted to store data corresponding to arguments;

an operator block adapted to store data corresponding to logical operators;

a Boolean block adapted to store data corresponding to Boolean operators;

a group block adapted to store data corresponding to groups, wherein groups may be related to one another by group Boolean operators selected from the Boolean operators, and wherein a group comprises at least one relation comprising selected arguments of the arguments, related by a selected logical operator of the logical operators;

a template block adapted to store data corresponding to a graphic image presentable by the output device and corresponding to interactive, two-dimensional regions uniquely corresponding to groups, relations, arguments, logical operators, and Boolean operators, respectively.

24. A method of separately selecting operators, including Boolean operators and logical operators, and arguments, for combination in a combined expression representing logical and Boolean operations on the arguments, the method comprising:

creating a first relation by selecting a first argument, selecting a first logical operator, and selecting a second argument related to the first argument by the first logical operator;

selecting a first Boolean operator relating the first relation to a second relation;

creating the second relation by selecting a third argument, selecting a second logical operator, and selecting a fourth argument related to the third argument by the second logical operator; and feeding back to a user by a display device, a text statement written in a natural language syntax, and corresponding to the first, second, third, and fourth arguments and the logical and Boolean operators.

25. The method of claim 24 further comprising validating the text statement by providing an interactive input to a processor from an input device operable by a user, the processor, input device, and display device being operably interconnected.

26. The method of claim 24 further comprising presenting graphically to a user an image representing a spatial visualization of the first relation, the first Boolean operator, and the second relation.

27. The method of claim 26 wherein a first graphical image type is used to present the first and second relations and a second graphical image type, different from the first graphical image type, is used to present the Boolean operator.

28. The method of claim 27 further comprising presenting to a user a dialogue box displayed on an output device, the dialogue box presenting a first spatial visualization corresponding to the first and second logical operators, and a second spatial visualization distinct from the first spatial visualization and corresponding to the Boolean operator.

29. The method of claim 27 further comprising providing to the output device a text statement written in a natural language syntax using text elements corresponding to the first argument, first logical operator, second argument, Boolean operator, third argument, second logical operator, and fourth argument.

30. The method of claim 29 wherein providing the text statement is executed incrementally to reflect an input, upon selection of the input, selected from the arguments and operators.

31. The method of claim 24 further comprising providing feedback to a user, the feedback comprising a textual statement presented in a syntax of a natural language and a graphical image comprising a spatial visualization of the first relation, the first Boolean operator, and the second relation.

32. The method of claim 31 wherein a first graphical image type is used to present information corresponding to the first and second logical operators and a second graphical image type, different from the first graphical image type, is used to present information corresponding to the Boolean operator.

33. A method comprising:
  selecting a database stored in a memory device, the database comprising a plurality of records, each record of the plurality of records comprising a plurality of fields, each field of the plurality of fields having a fieldname associated therewith and a fieldtype bound to the fieldname;
  initiating a dialogue for receiving inputs directed to a processor operably connected to the memory device, and for providing outputs directed from the processor;
  linking each of the fieldtypes to at least one logical operator;
  selecting a first selected fieldname from the plurality of fieldnames;
  selecting a first selected logical operator from said at least one logical operator;
  providing a first fieldvalue related to the first fieldname by the logical operator;
  selecting a selected Boolean operator for relating the selected fieldname to a second selected fieldname;
  selecting the second selected fieldname from the plurality of fieldnames;
  selecting a second selected logical operator, corresponding to the second selected fieldname, from the at least one logical operator corresponding to the second selected fieldname;
  providing a second fieldvalue related to a second selected fieldname by the second selected logical operator; and
  providing to an output device a text statement written in a natural language syntax using text elements comprising the first fieldname, an operator expression corresponding to the first selected logical operator, the fieldvalue, a Boolean expression corresponding to the Boolean operator, the second fieldname, a second logical operator expression corresponding to the second selected logical operator, and the second fieldvalue.

34. The method of claim 33 wherein at least one step of the method is repeated.

35. The method of claim 34 wherein the at least one step is repeated before any other step of the method is executed.

36. The method of claim 34 wherein the at least one step is repeated after another step is executed.

37. The method of claim 34 wherein the at least one step is repeated after all other steps have been executed at least once.

38. The method of claim 33 wherein the each text element of the text elements corresponds to an input element selected from the first selected fieldname, the first selected logical operator, the first fieldvalue, the Boolean operator, the second selected fieldname, the second selected logical operator, and the second fieldvalue.

39. The method of claim 38 wherein the text statement is updated to reflect said each text element immediately upon providing of the input element corresponding to said each text element.

40. The method of claim 39 further comprising executing a logical function in the processor, using the input elements.

41. The method of claim 33 further comprising executing a logical function in the processor, using the first selected fieldname, the first selected logical operator, the first fieldvalue, the Boolean operator, the second selected fieldname, the second selected logical operator, and the second fieldvalue.

42. The method of claim 33 wherein selecting a first selected fieldname further comprises:
  providing to the dialogue from the memory device a menu containing the plurality of fieldnames;
  designating a menu entry from the menu; and
  providing to the processor from the dialogue the menu entry as the first selected fieldname.

43. An apparatus comprising a processor running an application, an input device operably connected to the processor, an output device operably connected to the processor, a memory device operably connected to the processor, the output device comprising a template displaying:
  a first image corresponding to a first logical relation, the first image comprising a first argument window, adapted to present a first argument recognizable by the application, and a button effective to select a first logical operator bound to the first argument;
  a second image corresponding to a second logical relation, the second image comprising:
    a second argument window adapted to present a second argument related to the first argument by the first logical operator to form the first logical relation, the second argument being selectable by a user and recognizable by the application,
    a first new argument window adapted to present a first new argument recognizable by the application,
    a new button effective to select a first new logical operator bound to the new first argument, and
    a second new argument window adapted to present a second new argument related to the first new argument by the first new logical operator to form the second logical relation, the second new argument being selectable by a user and recognizable by the application;

a third image corresponding to a first Boolean relation relating the first logical relation to the second logical relation.

44. The apparatus of claim 44 wherein the third image further comprises:

a Boolean button adapted to interact with a user to select a Boolean operator to form the Boolean relation; and a Boolean symbol associated with the Boolean button and reflecting the Boolean relation.

45. The apparatus of claim 43 wherein the template further displays a text window displaying a language text equivalent of the first logical relation, second logical relation, and first Boolean relation.

46. An apparatus comprising:

a processor running an application;

an input device operably connected to the processor;

an output device operably connected to the processor;

a memory device operably connected to the processor;

the output device comprising a template displaying:

a first image corresponding to a first logical relation, a second image corresponding to a second logical relation and a third image corresponding to a first Boolean relation relating the first logical relation to the second logical relation, a first group, the first group including the first and second logical relations and the first Boolean relation, a second group related to the first group by an inter-group Boolean operator, and a second Boolean button corresponding to the inter-group Boolean operator.

47. An apparatus comprising:

a processor running an application;

an input device operably connected to the processor;

an output device operably connected to the processor;

a memory device operably connected to the processor; and the output device comprising a template displaying:

a first image corresponding to a first logical relation, a second image corresponding to a second logical relation, a third image corresponding to a first Boolean relation relating the first logical relation to the second logical relation, and a text window feeding back to a user a language text equivalent of the first logical relation, second logical relation, and first Boolean relation, all selected by a user.

\* \* \* \* \*